C. H. COMSTOCK.

End-Gate for Wagons.

No. 8,720. Reissued May 20, 1879.

Witnesses:

H. F. Burns.

O. W. Bond.

Inventor:

Charles H. Comstock

UNITED STATES PATENT OFFICE

CHARLES H. COMSTOCK, OF ASHKUM, ILLINOIS.

IMPROVEMENT IN END-GATES FOR WAGONS.

Specification forming part of Letters Patent No. 101,102, dated March 22, 1870; Reissue No. 8,720, dated May 20, 1879; application filed March 12, 1879.

*To all whom it may concern:*

Be it known that I, CHARLES H. COMSTOCK, formerly of Chebanse, and now of Ashkum, in the county of Iroquois and State of Illinois, have invented certain new and useful Improvements in End-Gates for Grain-Wagons, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

Figure 1:
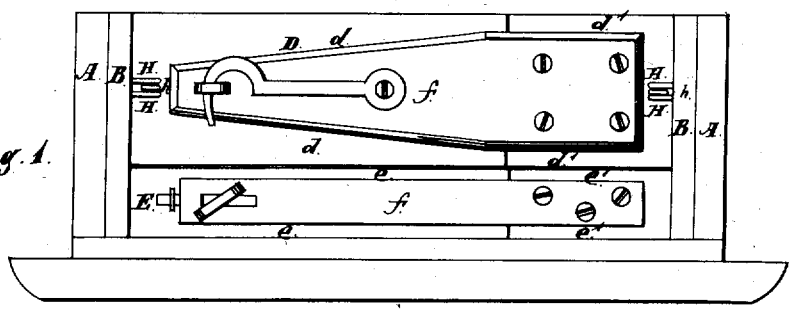
Figure 2:
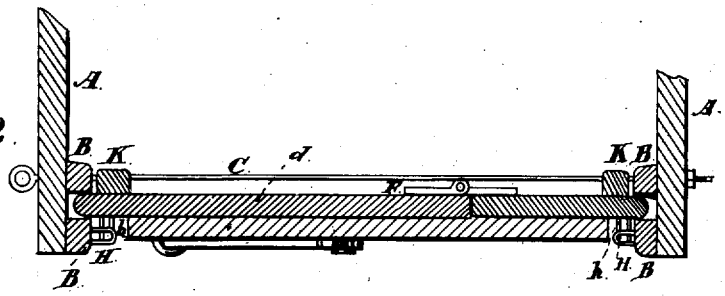
Figure 3:
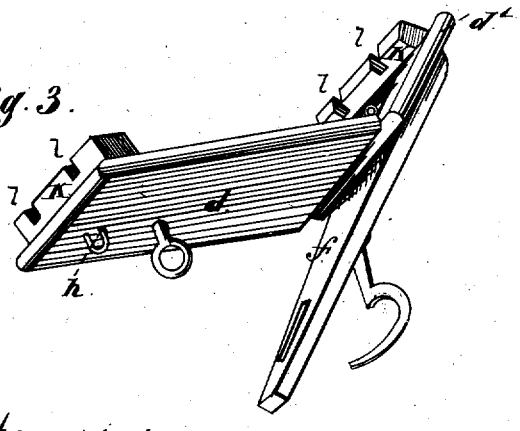

Figure 1 represents the rear elevation, and Fig. 2 the plan, of the gate. Fig. 3 is a perspective view of the gate.

The nature of my invention consists in arranging the end board or gate of wagons, carts, &c., in such a manner as to have the said gate folding, and so constructed as to be conveniently taken out or replaced, in part or in whole, as will be hereinafter fully explained.

A A are side-boards of a vehicle. B B are the cleats, forming grooves, into which the ends of the gate are placed. C is the rod binding the sides, one or more being used.

The gate may be made single or double; when double, it consists of two parts or two separate gates, D and E, one placed above the other.

Each gate, as shown, is made of two unequal parts, *d d'* and *e e'*, which parts are jointed by hinge or hinges F.

To the parts *d'* and *e'* levers or tails *f f* are securely affixed, the movable ends of which levers are to be secured to the parts *d* and *e* of the gates by hook and staple, spring-catch, or any other suitable fastening.

By extending the locking-bar *f* over or across the pivot or joint, a leverage is gained for inserting the gate in place, and less strain comes upon the joint or pivot and upon the locking device when the vehicle is loaded.

The gates D and E are provided with cleats K K on the inside, which cleats are provided with suitable notches *l l* for the rods C to pass through and keep the gates down in place.

If desirable, instead of the rod or rods C, loops or staples H H can be affixed to the cleats B B, between which come the staples *h h*, affixed to the gate, and pins or bolts can be put through the said staples, thus binding the side-boards of the vehicle to the gate.

For ordinary wagons, a gate of one piece or a single gate, as shown in Fig. 3, and made in the manner described, can be used.

The operation of the gate consists in this: that when the gate is double, and the vehicle containing grain is to be unloaded, the lower gate alone is taken out; but for unloading ear-corn both gates may be taken out.

This gate will be found useful in unloading vegetables, coal, and other articles.

The advantages of the above-described gate consist in the convenience of taking it out or placing it in without slackening or taking out the rod or rods C, as in folding or unfolding a gate a leverage is obtained by means of the lever *f*. Another advantage is that the grain can be very conveniently unloaded from wagons on the grain-dumpers.

What I claim as new, and desire to secure by Letters Patent, is—

1. A lower or under end-gate section made in two parts, hinged, and locked in place by a lever or bar crossing the pivot or joint, substantially as specified.

2. The end-gate consisting of the gates D E, each made of two parts, *d d'* and *e e'*, hinged together and made folding, the parts *d' e'* of the said gates provided with levers or tails *f f*, adapted to be secured to the other parts by any suitable fastenings, the whole arranged and operating substantially as herein set forth and specified.

3. As an improved article of manufacture, an end-gate adapted by means of a joint between its ends to be inserted or removed by folding or yielding, and having a locking device to keep the parts in position when in place, substantially as described.

4. In combination with a hinged end-gate, the staples H H *h*, secured together by a pin or bolt, substantially as set forth, and for the purpose specified.

CHARLES H. COMSTOCK.

Witnesses:

W. B. CUNNINGHAM,

L. L. BOND.